US010583938B2

(12) United States Patent
Mehrholz et al.

(10) Patent No.: US 10,583,938 B2
(45) Date of Patent: Mar. 10, 2020

(54) GROUND SUPPORT EQUIPMENT FOR AN AIRCRAFT VIDEO SURVEILLANCE SYSTEM

(71) Applicant: AIRBUS OPERATIONS GMBH, Hamburg (DE)

(72) Inventors: Holger Mehrholz, Hamburg (DE); Axel Redemann, Hamburg (DE); Michael Schmelz, Hamburg (DE); Joern Stuebner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 366 days.

(21) Appl. No.: 15/485,873

(22) Filed: Apr. 12, 2017

(65) Prior Publication Data
US 2017/0302888 A1    Oct. 19, 2017

(30) Foreign Application Priority Data

Apr. 15, 2016   (EP) ..................................... 16165560

(51) Int. Cl.
*B64F 1/36*     (2017.01)
*H02J 9/06*     (2006.01)
*B64D 47/08*    (2006.01)

(52) U.S. Cl.
CPC ............... *B64F 1/36* (2013.01); *B64F 1/362* (2013.01); *H02J 9/062* (2013.01); *B64D 47/08* (2013.01)

(58) Field of Classification Search
CPC ......... B64F 1/36–364; B64F 1/28; B64F 1/34
See application file for complete search history.

(56) References Cited

U.S. PATENT DOCUMENTS 8,674,823 B1 *    3/2014   Contario ................... H02J 1/10
                                                          340/333
2004/0011918 A1    1/2004   Musial et al.
(Continued)

FOREIGN PATENT DOCUMENTS

WO    WO 2015/133985 A1    9/2015
WO    WO-2016141114 A1 *   9/2016    ................ B64F 1/34

OTHER PUBLICATIONS

Extended European Search Report for Application No. 16165560 dated Sep. 26, 2016.
(Continued)

*Primary Examiner* — Rexford N Barnie
*Assistant Examiner* — David A Shiao
(74) *Attorney, Agent, or Firm* — Jenkins, Wilson, Taylor & Hunt, P.A.

(57) ABSTRACT

An aircraft ground support equipment, GSE, unit for externally accessing video data from an aircraft video surveillance system, AVSS. The GSE unit constitutes a back-up AC power supply for the aircraft's AVSS and comprises a power output connector for connecting a power cable to a ground connection panel on the outside of the aircraft. AC power is supplied either by a rechargeable battery through a converter, or by mains power plugged into the GSE unit. A power source selection switch is switched to route either battery power or external power to the aircraft dependent on factors including battery status, presence of power at the external power connector and presence of power in the aircraft. Video data from the AVSS can thus be streamed out, even in the absence of aircraft power, for example to a portable personal computer.

13 Claims, 4 Drawing Sheets

(56) References Cited

U.S. PATENT DOCUMENTS

| | | | | |
|---|---|---|---|---|
| 2006/0157987 | A1* | 7/2006 | Albrecht | B64F 1/34 |
| | | | | 290/1 A |
| 2007/0235587 | A1* | 10/2007 | Delort | B64F 1/364 |
| | | | | 244/114 R |
| 2009/0113494 | A1* | 4/2009 | Weidel | B64D 45/0015 |
| | | | | 725/76 |
| 2009/0283343 | A1* | 11/2009 | Wurth | B64F 1/34 |
| | | | | 180/53.5 |
| 2013/0168499 | A1* | 7/2013 | Grossman | B64D 7/00 |
| | | | | 244/135 A |
| 2014/0117764 | A1 | 5/2014 | Navarro | |
| 2014/0210399 | A1* | 7/2014 | Urschel | H02J 1/00 |
| | | | | 320/107 |
| 2015/0344152 | A1* | 12/2015 | Stevens | B64F 1/34 |
| | | | | 307/9.1 |
| 2015/0380955 | A1* | 12/2015 | Urschel | H02J 7/007 |
| | | | | 320/107 |
| 2016/0204651 | A1* | 7/2016 | Pancheri | H02J 9/061 |
| | | | | 307/23 |
| 2017/0267377 | A1* | 9/2017 | Rheaume | B64F 1/225 |

OTHER PUBLICATIONS

European Office Action for Application No. 161655600 dated Dec. 7, 2018.

* cited by examiner

GROUND SUPPORT EQUIPMENT FOR AN AIRCRAFT VIDEO SURVEILLANCE SYSTEM

CROSS-REFERENCE TO RELATED APPLICATION

This application claims priority to European Patent Application EP 16 165 560.0 filed Apr. 15, 2016, the entire disclosure of which is incorporated by reference herein.

TECHNICAL FIELD

The present disclosure relates to ground support equipment (GSE) for an aircraft and more particularly to a GSE unit for externally supporting an aircraft video surveillance system (AVSS).

BACKGROUND

An AVSS captures video feeds from a number of cameras mounted at various locations in an aircraft. AVSSs are a feature of civilian aircraft in particular. Video data acquired by each camera are sent to a control unit of the AVSS through wired data communication lines in the aircraft. These video data can be collected, monitored and stored for various purposes including safety, maintenance and security. External access to the AVSS is possible via an access panel, known as a ground connection panel (GCP), located somewhere convenient on the outside of the aircraft. The GCP may be located on the belly fairing, for example.

It is known for the GCP to be provided with a video data connector via which the AVSS can be connected to ground support equipment (GSE), referred to in the following as a GSE unit, so as to form a data communication path between the AVSS and the GSE unit via which video data may be transmitted from the AVSS to the GSE unit. The GSE unit is a mobile and/or portable unit. It is known for the GSE unit to consist of, or include as part thereof, a computer, which has an appropriate software application installed thereon for displaying AVSS video data on the computer's display.

It is also known for the GCP to be provided with a power input connector, so that, when power from the aircraft is not available, power can be provided to the aircraft externally by connecting a power supply cable to the power input connector. The AVSS can thus be powered externally in the absence of power from the aircraft's own power supply. For this purpose, a power supply cable connects a suitable external power supply to the power input connector. The external power supply is matched to that required by the aircraft, for example 115 V AC at a frequency of 400 Hz.

SUMMARY

According to a first aspect of the disclosure herein, there is provided a ground support equipment unit for enabling ground crew to support an aircraft video surveillance system from outside an aircraft via a ground connection panel. The unit comprises: a power output connector for connecting a power cable to a power input connector on an aircraft's ground connection panel, thereby to enable external power supply to the aircraft video surveillance system; a rechargeable battery and a converter arranged to output AC power at a specified voltage and frequency; an external power connector for connecting an external power cable carrying AC power; and a power source selection switch connected to receive power from the converter and the external power connector and which is switchable to route power either from the rechargeable battery via the converter or from an external power source via the external power connector to the power output connector.

The provision of battery power allows external access to the AVSS over longer periods of time, even if the aircraft is far away from an external ground power supply. A feature of the GSE unit is that it can permit discreet access to the AVSS, which can be valuable in critical situations, such as during a hijack or other ongoing incident on board the aircraft. The GSE unit is also useful for monitoring an empty or unattended aircraft while it is parked to provide an alert when any persons are filmed inside the aircraft during this time. The GSE unit is also useful for recording the video feed acquired while the aircraft is empty or unattended to provide a video, and optionally also audio, record of activity which can be studied if and when required.

In some embodiments, the power source selection switch is manually actuatable. Namely, a manual switch actuator is provided which is user operable to switch the power source selection switch.

In other embodiments, the power source selection switch is controlled automatically according to a logic scheme. Namely, a controller is provided which is configured to switch the power source selection switch dependent on factors including battery status and presence of power at the external power connector.

For embodiments with a controller, in a situation when power is sensed by respective status sensors to be available both from the rechargeable battery and from an external power source via the external power connector, the controller is configured to control the power source selection switch preferentially to select the rechargeable battery. A user-actuatable switch may additionally be provided to toggle between battery power and external power, the controller having logic to permit such user-actuated toggling conditional on both sources of power being available as sensed by the respective status sensors.

For embodiments with a controller, the unit may further comprise an aircraft power status sensor, wherein the controller also takes account of power status in the aircraft, as sensed by the aircraft power status sensor, as a factor for switching the power source selection switch, such that, if the aircraft power status sensor indicates presence of power in the aircraft for the aircraft video surveillance system, the controller sets the power source selection switch to an open circuit position, but, if the aircraft power status sensor indicates absence of power in the aircraft, the controller switches to the rechargeable battery or to the external power source. Moreover, when the aircraft video surveillance system is operating under power from the aircraft, the controller can be operable to monitor the aircraft power status sensor and, if loss of power in the aircraft is sensed, switches the power source selection switch to supply power either from the rechargeable battery or from the external power source, so as to maintain power uninterruptedly to the aircraft.

The unit may also be provided with a battery charger connected to charge the rechargeable battery; and a further external power connector connected to the battery charger to supply further external power to the battery charger for charging the rechargeable battery. The battery charger may be removably mounted, so that it can be removed from the ground support equipment unit and used as a stand-alone battery charger.

The rechargeable battery may also be removably mounted in the ground support equipment unit.

The unit may further comprise an aircraft video surveillance system data connector for connecting a data cable to a data connector on an aircraft's ground connection panel, thereby allowing data communication between the aircraft and the ground support equipment unit.

The unit may comprise a further aircraft video surveillance system data connector for connecting an external device to the ground support equipment.

According to a second aspect of the disclosure herein there is provided an assembly of parts comprising a ground support equipment unit as described above and a computer loaded with a software application including machine readable instructions for communicating, storing and displaying aircraft video surveillance system video data. The software application may also include machine readable instructions for communicating with the ground support equipment unit's controller in embodiments which have a controller.

According to a third aspect of the disclosure herein there is provided a system comprising an aircraft parked on the ground in combination with a ground support equipment unit according to the first aspect. The ground support unit is connected to the aircraft via a power cable having a first end connected to the ground support equipment unit via the power output connector and a second end connected to the aircraft via a power input connector on the aircraft's ground connection panel, thereby to enable external power supply to the aircraft video surveillance system. In the case that the ground support unit has an aircraft video surveillance system data connector as described above, the system may further comprise a data cable having a first end connected to the ground support equipment unit via the aircraft video surveillance system data connector and a second end connected to the aircraft via a data connector on the aircraft's ground connection panel, thereby allowing data communication between the aircraft and the ground support equipment unit.

BRIEF DESCRIPTION OF THE DRAWINGS

In the following, the present disclosure will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
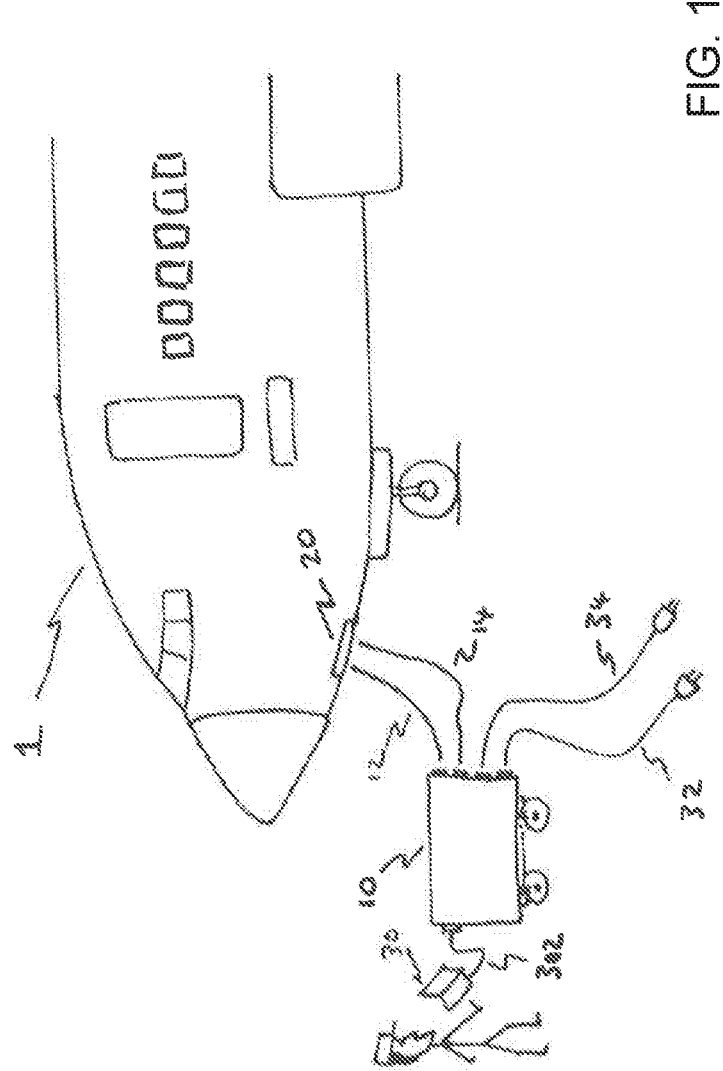
FIG. 1 is a schematic side view of a front portion of an aircraft parked on the ground while it is connected to a ground support equipment (GSE) unit according to an embodiment of the disclosure herein.

FIG. 1 is a schematic side view of a front portion of an aircraft 1 on the ground while it is connected to a ground support equipment (GSE) unit 10 according to an embodiment of the disclosure herein. The primary function of the GSE unit 10 is to enable ground crew to access the aircraft video surveillance system (AVSS). The GSE unit 10 is connected to the aircraft 1 at a ground connection panel (GCP) 20. The GCP 20 is an aircraft panel that is accessible from the outside of the aircraft by ground crew. Cables 12 and 14 are schematically shown connecting the GSE unit 10 to the GCP panel 20 for carrying data and power respectively. In addition, the GSE unit 10 has external power cables 32 and 34 for supplying AC power to the GSE unit, generally at different voltage and frequency ratings as described further below. The GSE unit 10 is also shown connected to a portable personal computer 30 via a data cable 302. A member of the ground crew is illustrated holding the computer 30 and viewing an AVSS video feed on its display.

Figure 2:
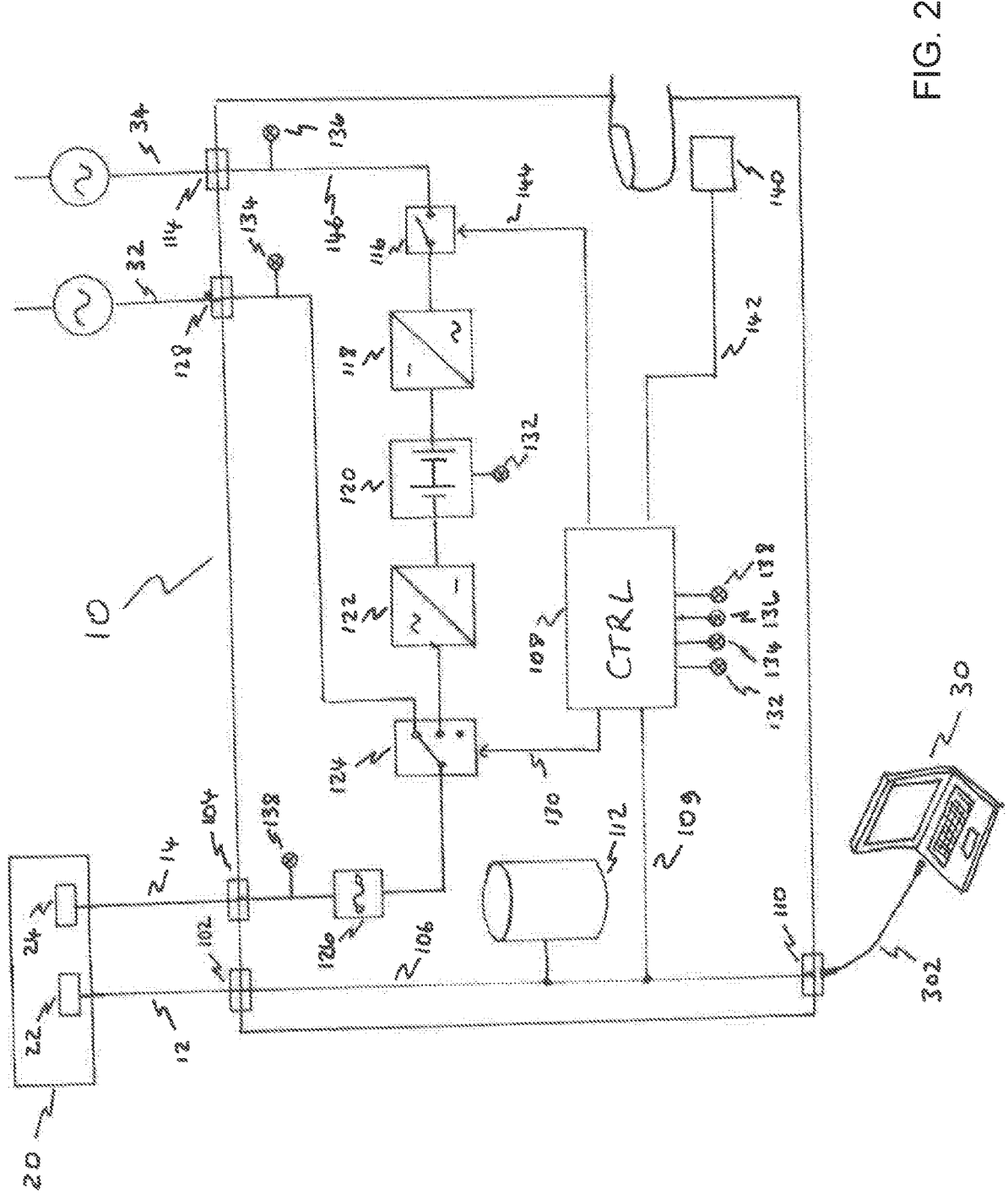
FIG. 2 is a schematic circuit diagram showing details of the GSE unit according to one embodiment.

FIG. 2 is a schematic circuit diagram of the GSE unit 10 according to one embodiment, which also shows the GCP 20 and the computer 30. The power cable 14 is connected at one end to the GSE unit 10 by a power output connector 104 and at the other end to the GCP 20 by a power input connector 24. The data cable 12 is connected at one end to the GSE unit 10 by a GSE-side data connector 102 and at the other end to the GCP 20 by a GCP-side data connector 22. Data communication between the parked aircraft and the GSE unit 10 is thus enabled.

In an embodiment, these data cables and connectors conform to an aircraft bus standard. A bus system is used in avionics for transmitting data between multiple devices in an aircraft, for example using a packet based data communication protocol. One example bus system is the ARINC 429 standard, which is currently perhaps the most commonly used data transmission protocol in civilian aircraft. Another example bus system is the Ethernet standard, which is an industrial standard, but is also used for avionics.

The GSE-side data connector 102 feeds through into an internal data line 106, which is preferably a data bus, more preferably a data bus conforming to a standard used in avionics. The internal data line 106 connects to a GSE controller 108 and to an external data connector 110. The purpose of the data connector 110 is to allow connection to an external device via an appropriate data cable 302, which is illustrated as being the computer 30. Other external devices could also be usefully connected which are capable of receiving video data from the AVSS and applying some relevant function to these video data, such as storing, transmitting (wirelessly or by wire), displaying and processing. References to the computer 30 further below can therefore be considered to apply also to other external devices that can be usefully connected to receive the AVSS video feed.

The GSE controller 108 through its connection 109 to the internal data line is able to participate in data communication to and from the aircraft and the computer 30. In particular, the computer 30 and the controller 108 are both able to receive video data from the aircraft collected by the AVSS.

It is noted that the computer 30 could also be connected directly to the data connector 22 on the GCP 20 rather than via the GSE unit 10. If the GCP 20 has a further data connector (not shown), then both the GSE unit 10 and the computer 30 could be connected at the same time via respective data connectors.

The computer 30 and the GSE controller 108 can thus be connected to the aircraft's data bus and can additionally acquire information of interest from the AVSS, such as the status of individual cameras and the status of the aircraft's power supply for the AVSS. The computer 30 and/or the GSE controller 108 could also have machine readable instructions stored thereon which when executed perform AVSS control functions, so that the AVSS and other related avionic components can be controlled and monitored externally. For example, to conserve power on the aircraft or the GSE unit's battery, the GSE controller 108 or the computer 30 can issue commands to shut down some power consuming devices on the aircraft, such as AVSS cameras which are not providing useful video footage. The AVSS can thereby be accessed for longer periods of time before power runs out.

A data storage device 112 is also illustrated connected to the internal data line 106 which may be used, for example, as a video buffer for AVSS video data. For example, the data storage device 112 could be configured and controlled by the GSE controller 108 automatically to store the data stream output from the aircraft, and in particular video data from the AVSS cameras. The stored data can then be read out by the computer 30 once connected.

The data storage device 112 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the data storage device 112 includes the following: a hard disk, a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing.

Having described the data-related components, the power-related components of the GSE unit 10 are now described.

An important function of the GSE unit 10 is to provide an intelligently switchable, uninterruptable power supply for the aircraft's AVSS. As described further above, the GSE unit 10 supplies power to the aircraft via the power cable 14. The GSE unit 10 has a rechargeable battery or accumulator 120 and a converter 122 arranged in series to output AC power at a specified voltage and frequency to the power output connector 104. For example, the battery 120 may be rated to output 24V DC and the converter to output 115V AC at 400 Hz. Other example voltages are possible and other frequencies lie in the range 360 to 800 Hz. It will be understood that the voltage and frequency are chosen to match that provided by the aircraft's own internal power supply. It will be understood that the term converter refers in a non-limiting way to a component for performing a DC-to-AC conversion, i.e. a DC-to-AC converter.

The GSE unit 10 has an external power connector 128 for connecting an external power cable 32 carrying AC power preferably at at least approximately the same voltage and frequency as output by the converter 122. It will be understood that the aircraft's AVSS will be specified with a tolerance to variations in external power supply, so that the voltage and frequency of the power supplied via external power cable 32 need not match that provided internally by the converter 122. It is only necessary that both are within the requirements of the aircraft's AVSS.

The GSE unit 10 has a single-pole triple-throw power source selection switch 124 which is connected so that one contact receives power from the converter 122 and another contact receives power from the external power connector 128. A third contact is not connected and is provided for leaving the switch open circuit, for example when the AVSS is being powered by the aircraft's own power supply.

The power source selection switch 124 is switchable via a control line 130 from the GSE controller 108 to route power from either the battery 120 via the converter 122 or from the external power connector 128 to the power output connector 104 via a circuit breaker box 126. In its open circuit position, neither power source is connected.

The power cable 14 may be a multi-wire cable with different wires connected to respective different pins on the power connector 24. In such a case the circuit breaker switch box 126 can include individual circuit breakers for the different wires powering different AVSS components.

The GSE controller 108 is configured to switch the power source selection switch 124 dependent upon factors including battery status and presence of external power at the external power connector. The configuration of the GSE controller 108 can be defined, for example, by programmable logic circuitry, such as field-programmable gate arrays (FPGA) or programmable logic arrays (PLA) or in software. Battery status is monitored by the GSE controller 108 via a status sensor 132. The battery status may be a simple binary indicator of fully charged or fully discharged, or a more graduated indicator indicating percentage charge. Further information may also be included such as health of individual cells of the battery and cell temperature. The availability of external power is monitored by the GSE controller 108 via a power status sensor 134.

The GSE unit 10 is also provided with components to allow the rechargeable battery 120 to be charged in situ. Namely, a battery charging circuit 118 has its output connected to the rechargeable battery 120 and its input to a controllable single-pole single-throw switch 116 which in its closed position connects the battery charging circuit 118 to a further external power connector 114 via an internal power line 146.

The further external power connector 114 is illustrated as being connected to an external AC power supply via a power cable 34. The switch 116 is controlled by the GSE controller 108 via a control line 144 dependent on the availability of external power at connector 114 as detected by status sensor 136 and the battery status sensor 132. Namely, the switch 116 is closed to supply the battery charging circuit 118 with power, if it is sensed that power is available and if the battery status is sensed to be in a condition deemed to benefit from charging. It is noted that the battery charging circuit 118 will beneficially be designed to operate from mains power, e.g. 110-240 V AC at 50-800 Hz, which will in general be different from the power specification of the avionics, which as mentioned above may be 115 V at 400 Hz.

The rechargeable battery 120 is preferably removably mounted in the GSE unit 10. This allows a discharged or faulty battery to be taken out and replaced. Features such as quick-release terminal connectors may be provided to facilitate removal and installation.

The battery charging circuit 118 is preferably arranged in a single module which is removably mounted in the GSE unit 10. The allows the battery charging circuit to be removed as a module and used as a stand-alone battery charger. This may be useful, for example, to charge spare batteries.

A further feature illustrated is a user-actuatable switch 140 which has the function of allowing a user, i.e. ground crew, to toggle between battery power and external power when both are available. The switch state is sent to the GSE controller 108 via a data line 142 so that the GSE controller 108 can take account of this input as part of the logic which determines how the avionics are to be powered.

The following table summarizes the logic applied by the GSE controller 108 to control the power source selection switch 124. Namely, the power supply used to power the avionics is selected based on whether: the aircraft has power, there is external power available at connector 128, and there is battery power available via the battery 120.

| Aircraft Power | Battery | External Power | SELECTED POWER SOURCE |
|---|---|---|---|
| yes | don't care | don't care | Aircraft Power |
| no | no | yes | External Power |
| no | yes | no | Battery |
| no | yes | yes | Battery (default) with option manually to change to external power via switch 140 |

The GSE controller 108 takes account of power status in the aircraft as a factor for switching the power source selection switch 124. Presence or absence of aircraft power is measured by status sensor 138 which senses power on the power line 135 which connects the circuit breaker box 126 to the power connector 104. If the aircraft power status sensor 138 indicates presence of aircraft power, the controller 108 positions the power source selection switch 124 to be open circuit, but if the aircraft power status 138 indicates absence of power within the aircraft, the controller 108 switches to the battery 120 or to the external power connector 128. Specifically, when the AVSS is operating under power from the aircraft, the GSE controller 108 is operable to monitor aircraft power status and, if loss of power in the aircraft is sensed, acts to switch in power from the battery or from external power, so as to maintain power uninterruptedly to the aircraft. The GSE unit 10 thus acts as a seamless back-up power supply, which, in the case of the AVSS, avoids the AVSS shutting down and rebooting upon loss of aircraft power with the consequent undesirable temporary loss of the video feeds.

It is noted that whether the aircraft has power can also be sensed by the GSE controller 108 through the data connection 22/12/102/106.

Figure 3:
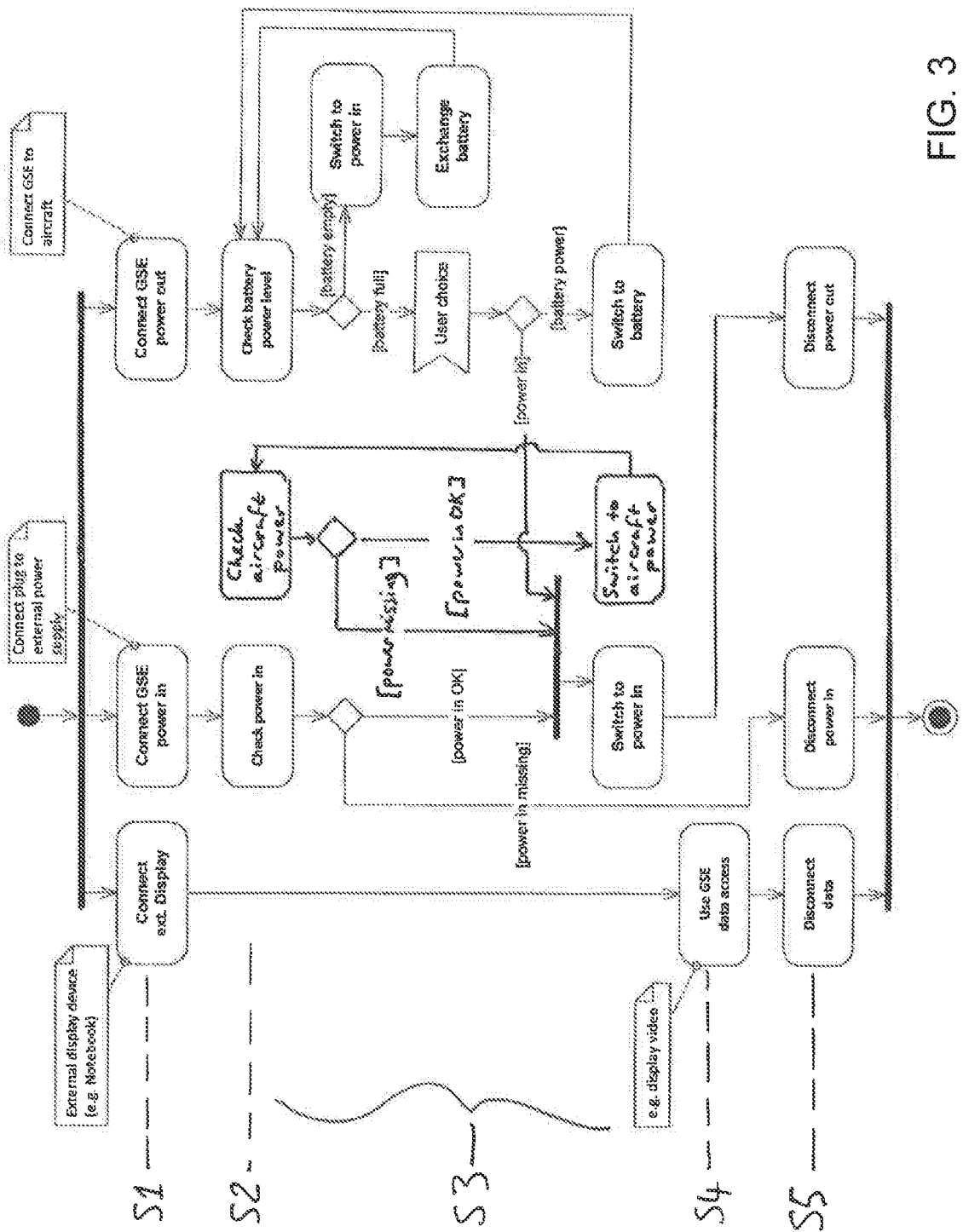
FIG. 3 is an activity diagram of the GSE unit of FIG. 2.

A method of deploying the GSE unit 10 of FIG. 2 is now described with reference to FIG. 3 which is an activity diagram for operating the GSE unit 10.

Step S1—Commission GSE Unit by Connecting Power and Data Cables

Connect the computer 30: the data cable 302 between the aircraft data connector 22 and the computer 30 (directly, or indirectly via the GSE unit's data connector 110).

Connect GSE power in: the power cable 32 to the GSE unit power connector 128.

Connect GSE power out: the power cable 14 between the GSE unit and aircraft.

Step S2—Check Availability of Different Power Sources

Check power in: check if power is available from the external power source via power cable 32 using status sensor 134.

Check battery power level: check if battery status sensor 132 shows the battery 120 is available. If battery is empty, then replace with a fresh battery. (Alternatively, charge the battery in situ if external power is available via power cable 34.)

Check aircraft power: check for presence of power at status sensor 138 with switch 124 in open circuit position.

Step S3—Select Most Appropriate Power Supply

If external power is not available, switch to battery power.

If battery power is not available (e.g. battery flat, or no battery present), switch to external power.

If both battery power and external power are available, switch to battery power.

However, overriding the above selection between battery power and external power, if aircraft power is available, use aircraft power.

Monitor aircraft power (if present).

Monitor battery power (if battery in use).

Step S4—Monitor AVSS Video Feed

Use GSE unit access. AVSS video is displayed on a display of the computer 30.

Step S5—Decommission GSE Unit

Stop video monitoring.

Disconnect all cables (reverse of Step 1).

Figure 4:
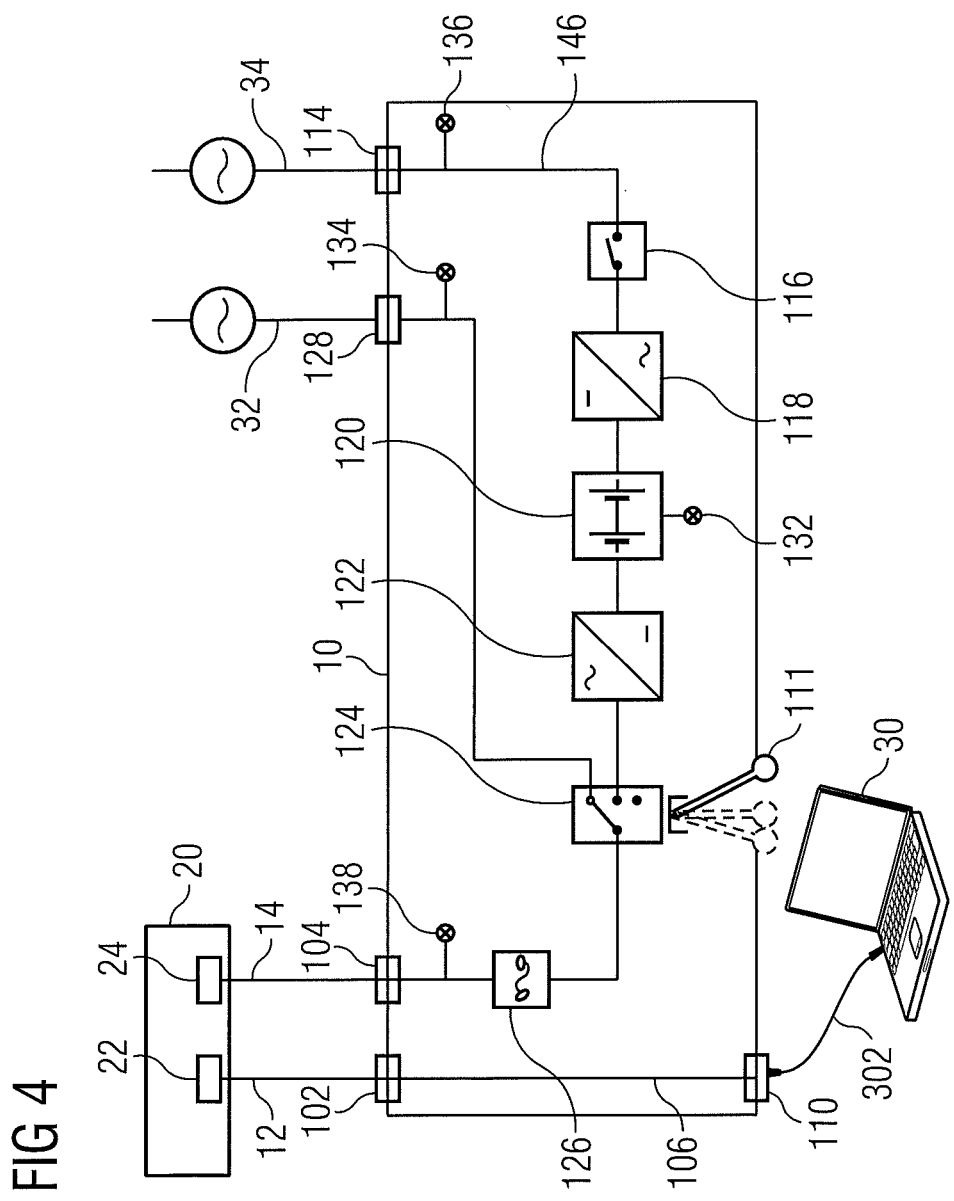
FIG. 4 is a schematic circuit diagram showing details of the GSE unit according to an alternative embodiment.

FIG. 4 shows an alternative embodiment of the GSE unit 10 which, in comparison to the embodiment of FIG. 2, omits the control electronics, specifically the controller 108, the data storage device 112 and various sensor, control and data lines 109, 130, 142, 144 that connect to the controller 108 as well as toggle switch 140. The features common to the embodiments of FIG. 2 and FIG. 4 have the same construction and functions unless now mentioned so are not described again for the sake of brevity. The main difference between the embodiment of FIG. 2 and that of FIG. 4 is that, in the embodiment of FIG. 4, the power source control switch 124 is manually actuated, whereas, in the embodiment of FIG. 2, it is actuated by the controller 108 according to the controller's logic.

For manually actuating the power source control switch 124, a manual switch actuator 111 is provided, which is illustrated schematically in FIG. 4 as a 3-position lever. In a preferred implementation, the GSE unit is also provided with visual indicators, such as indicator lights, to show the status of each of the three possible power sources, as measured by each of the status sensors 132, 134 and 138. (A further indicator light may also be provided for the status sensor 136.) These lights will typically be aligned in some intuitively appreciable way with the manual switch actuator 111. Suitable manual switch actuators are press buttons, a discrete multi-position knob or a discrete multi-position lever, for example.

Figure 5:
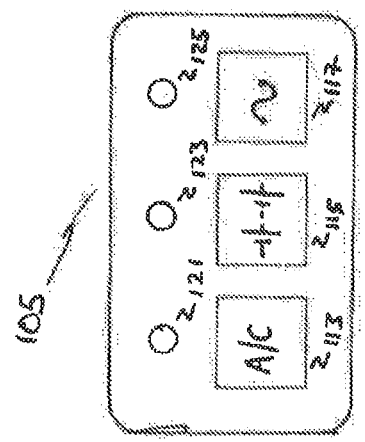
FIG. 5 shows an example control panel for the GSE unit of FIG. 4.

FIG. 5 shows an example control panel 105 based on using press buttons to select the desired power source. This example control panel located on the GSE unit 10 illustrates one possibility for providing intuitive switching between the available power sources. Three press buttons 113, 115 and 117 are provided for respectively selecting aircraft power, battery power and mains power respectively, i.e. for moving the 3-way switch 124 to each of its three positions. The press buttons have readily understood functional descriptors on their surface, as illustrated. The functional descriptors may glow to assist night-time use. Adjacent to each button there is a respective indicator light 121, 123 and 125. Each indicator light may be a cluster of red, orange and green light emitting diodes joined to a common lens. If no power is available for the particular source, then the light emits red light. If power is available from a particular source, but it is not presently being used as the power source, the indicator light emits orange light. If power is available from a particular source, and it is presently being used as the power source, the indicator light emits green light. Ground crew therefore know which source is currently selected by the green light, and which other sources are available and hence potentially selectable by the orange light(s) and which sources are not available by the red light(s). It will be understood that many other intuitive manual switching schemes are possible, and the one just described is given by way of example.

The computer 30 used in the above embodiments to take the video feed from the AVSS, and also optionally perform other functions specified above, may be of the types referred to as laptops, notebooks or tablets, for example.

The computer 30 is loaded with a software application including machine readable instructions. The software application includes video data handling functionality, e.g. for receiving, storing and displaying AVSS video feeds either directly from the aircraft (either directly from the data connector 22 or via the data connector 110) or as a buffered or stored feed from the data storage device 112. Other video functions may be provided, such as image recognition to identify motion in video footage, image enhancement by noise reduction, video editing facilities and so forth.

The software application may also include functionality for communicating with the GSE unit's controller, e.g. to monitor status information known to the controller, such as power availability, battery status, switch position of switch 124 and so forth. The software application may also provide an overall control function of the GSE unit via the controller, so that ground crew can effectively operate the GSE unit via the software application. When there is no computer 30 or other external device connected, the GSE unit will default to autonomous control via its controller 108. In addition, the software application may have the ability to reprogram the controller 108, e.g. to perform software or firmware updates on the controller.

The software application for the computing device 30 and, in the case of the embodiment of FIG. 2, the software of firmware used by the GSE controller 108 may be stored on a computer program product. The computer program product may include a computer readable storage medium having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

It will be appreciated that a kit or assembly of parts may be provided which comprises the GSE unit, a computer loaded with a suitable software application and appropriate power cables and data cables for connecting between the GSE unit, the computer, the aircraft and the power sources for supplying external power to the aircraft and for recharging the GSE unit's battery.

It will be understood that various features of the embodiments of FIG. 2 and FIG. 4 are optional and could be omitted either singly or in combination. For example, the battery charging features 114, 116, 118, 144, 136 and 146 are optional and could be dispensed with, albeit with loss of functionality. The video data routing capability could be omitted, in which case the GSE unit would solely perform power supply back up functions and in this case a computer 30 could be directly connected to the data connector 22 on the GCP 20. In another variation, the GSE unit has no ability to sense aircraft power status, so the controller logic (FIG. 2) or manual switch actuator (FIG. 4) is solely concerned with supplying either battery power or external power. In this case, the power source selection switch would not need its open circuit position contact. Instead, the aircraft avionics could have suitable sensors and controllers selectively to connect through external power from the power connector 24 according to the aircraft power supply status. In other words, the role of the power sensor 138 and associated elements is partly transferred to the aircraft avionics. In the case of the embodiment of FIG. 2, the toggle switch 140 could be omitted.

References above to video should be understood to encompass video only and combined video and audio data. In other words, the AVSS may include microphones for audio capture as well as cameras for video capture.

In summary, an aircraft ground support equipment unit has been described for externally accessing video data from an aircraft video surveillance system. The ground support equipment unit constitutes a back-up AC power supply for the aircraft's aircraft video surveillance system and comprises a power output connector 104 for connecting a power cable 14 to a ground connection panel 20 on the outside of the aircraft. AC power is supplied either by a rechargeable battery 120 through a converter 122, or by an external ground power supply plugged into the ground support equipment unit. A power source selection switch 124 is switched to route either battery power or external power to the aircraft dependent on factors including battery status, presence of power at the external power connector and presence of power in the aircraft. Video data from the aircraft video surveillance system can thus be streamed out, even in the absence of aircraft power, for example to a portable personal computer 30.

The subject matter disclosed herein can be implemented in or with software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A ground support equipment unit for enabling ground crew to support an aircraft video surveillance system from outside an aircraft via a ground connection panel, the unit comprising:
   a power output connector for connecting a power cable to a power input connector on an aircraft's ground connection panel, thereby to enable external power supply to the aircraft video surveillance system;
   a rechargeable battery and a converter configured to output AC power at a specified voltage and frequency;
   an external power connector for connecting an external power cable carrying AC power;
   a power source selection switch connected to receive power from the converter and the external power connector and which is switchable to route power either from the rechargeable battery via the converter or from an external power source via the external power connector to the power output connector;
   a controller configured to switch the power source selection switch dependent on factors including battery status and presence of power at the external power connector; and
   an aircraft power status sensor for indicating presence of power in the aircraft;
   wherein the controller also takes account of power status in the aircraft, as sensed by the aircraft power status sensor, as a factor for switching the power source selection switch.

2. The unit of claim 1, further comprising a manual switch actuator which is user operable to switch the power source selection switch.

3. The unit of claim 1, wherein, in a situation when power is sensed by respective status sensors to be available both from the rechargeable battery and from an external power source via the external power connector, the controller is configured to control the power source selection switch preferentially to select the rechargeable battery.

4. The unit of claim 3, further comprising a user-actuatable switch to toggle between battery power and external power, the controller having logic to permit such user-actuated toggling conditional on both sources of power being available as sensed by the status sensors.

5. The unit of claim 1, wherein in response to the aircraft power status sensor indicating a presence of power in the aircraft for the aircraft video surveillance system, the controller is configured to set the power source selection switch to an open circuit position, and, in response to the aircraft power status sensor indicating an absence of power in the aircraft, the controller is configured to switch to the rechargeable battery or to the external power source.

6. The unit of claim 5, wherein, when the aircraft video surveillance system is operating under power from the aircraft, the controller is operable to monitor the aircraft power status sensor and, in response to sensing a loss of power in the aircraft, the controller is configured to switch the power source selection switch to supply power either from the rechargeable battery or from the external power source, so as to maintain power uninterruptedly to the aircraft.

7. The unit of claim 1, further comprising a battery charger connected to charge the rechargeable battery; and a further external power connector connected to the battery charger to supply further external power to the battery charger for charging the rechargeable battery.

8. The unit of claim 1, further comprising an aircraft video surveillance system data connector for connecting a data cable to a data connector on an aircraft's ground connection panel, thereby allowing data communication between the aircraft and the ground support equipment unit.

9. The unit of claim 8, further comprising a further aircraft video surveillance system data connector for connecting an external device to the ground support equipment unit in order to participate in the data communication, in particular to receive video data from the aircraft collected by the aircraft video surveillance system.

10. The unit of claim 8, further comprising a data storage device for storing video data collected by the aircraft video surveillance system.

11. A system comprising an aircraft parked on ground in combination with a ground support equipment unit according to claim 8, wherein the ground support equipment unit is connected to the aircraft via a power cable having a first end connected to the ground support equipment unit via the power output connector and a second end connected to the aircraft via a power input connector on the aircraft's ground connection panel, thereby to enable external power supply to the aircraft video surveillance system.

12. The system of claim 11, further comprising a data cable having a first end connected to the ground support equipment unit via the aircraft video surveillance system data connector and a second end connected to the aircraft via a data connector on the aircraft's ground connection panel, thereby allowing data communication between the aircraft and the ground support equipment unit.

13. An assembly of parts comprising a ground support equipment unit according to claim 1 and a computer loaded with a software application including machine readable instructions for communicating, storing and displaying aircraft video surveillance system video data.

* * * * *